(12) United States Patent
Yen et al.

(10) Patent No.: US 8,101,021 B2
(45) Date of Patent: Jan. 24, 2012

(54) FLOW METHOD AND REACTOR FOR MANUFACTURING NANOCRYSTALS

(75) Inventors: Brian Yen, Boston, MA (US); Axel Guenther, Somerville, MA (US); Klavs F. Jensen, Lexington, MA (US); Moungi G. Bawendi, Cambridge, MA (US); Martin Schmidt, Reading, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 250 days.

(21) Appl. No.: 11/955,774

(22) Filed: Dec. 13, 2007

(65) Prior Publication Data

US 2008/0115722 A1 May 22, 2008

Related U.S. Application Data

(62) Division of application No. 11/232,022, filed on Sep. 22, 2005, now Pat. No. 7,316,967.

(60) Provisional application No. 60/612,613, filed on Sep. 24, 2004.

(51) Int. Cl.
*C30B 35/00* (2006.01)
*H01L 21/20* (2006.01)

(52) U.S. Cl. ........ 117/204; 117/200; 117/900; 118/725; 438/479; 977/700

(58) Field of Classification Search .......... 117/200, 117/204; 118/725; 427/248.1, 255.3; 438/479; 977/700
See application file for complete search history.

(56) References Cited

U.S. PATENT DOCUMENTS

| | | |
|---|---|---|
| 2002/0025280 A1 | 2/2002 | Chazan et al. |
| 2002/0066401 A1* | 6/2002 | Peng et al. ............. 117/68 |
| 2003/0017264 A1* | 1/2003 | Treadway et al. ........ 427/212 |
| 2005/0098906 A1 | 5/2005 | Satoh et al. |
| 2005/0112849 A1* | 5/2005 | Stott et al. ............. 438/478 |
| 2005/0129580 A1* | 6/2005 | Swinehart et al. ........ 422/100 |
| 2005/0272159 A1 | 12/2005 | Ismagilov et al. |

* cited by examiner

*Primary Examiner* — Bob M Kunemund
(74) *Attorney, Agent, or Firm* — Steptoe & Johnson LLP

(57) ABSTRACT

A population of nanocrystals having a narrow and controllable size distribution and can be prepared by a segmented-flow method.

5 Claims, 12 Drawing Sheets

G: 40 μL/min, L: 20 μL/min
T=260 °C

FLOW METHOD AND REACTOR FOR MANUFACTURING NANOCRYSTALS

CLAIM OF PRIORITY

This application is a divisional of U.S. patent application Ser. No. 11/232,022, filed Sep. 22, 2005, now U.S. Pat. No. 7,316, 967 which claims priority under 35 U.S.C. 119(e) to U.S. Provisional Application Ser. No. 60/612,613, filed Sep. 24, 2004, each of which is hereby incorporated by reference.

FEDERALLY SPONSORED RESEARCH OR DEVELOPMENT

This invention was made with government support under Grant No. DMR-0213282 awarded by the National Science Foundation. The government has certain rights in this invention.

TECHNICAL FIELD

The invention relates to methods of preparing nanocrystals.

BACKGROUND

Nanocrystals having small diameters can have properties intermediate between molecular and bulk forms of matter. For example, nanocrystals based on semiconductor materials having small diameters can exhibit quantum confinement of both the electron and hole in all three dimensions, which leads to an increase in the effective band gap of the material with decreasing crystallite size. Methods of preparing monodisperse semiconductor nanocrystals include pyrolysis of organometallic reagents, such as dimethyl cadmium, injected into a hot, coordinating solvent. This permits discrete nucleation and results in the controlled growth of macroscopic quantities of nanocrystals. Typically, the nanocrystals are prepared in a batch process.

SUMMARY

A segmented-flow method of manufacturing a nanocrystal can produce high quality nanocrystals. In one aspect, a method of manufacturing a population of nanocrystals includes transporting alternating gas and liquid volumes through a flow path, the liquid volume including an M-source and an X donor, heating the alternating gas and liquid volumes to a temperature for a time sufficient to grow a nanocrystal, and cooling the alternating gas and liquid volumes to form the population of nanocrystals.

In one aspect, a method of manufacturing a population of nanocrystals includes transporting alternating gas and liquid volumes through a flow path, the liquid volume including a nanocrystal precursor, heating the alternating gas and liquid volumes to a temperature for a time sufficient to grow a nanocrystal, and cooling the alternating gas and liquid volumes to form the population of nanocrystals. The method can include introducing the liquid into the flow path and introducing the gas into the flow path. The flow path can include a first region configured to generate recirculation in at least one of the liquid volumes. The first region can include a meandering section. The flow path can include a second region associated with a thermal source configured to heat the alternating gas and liquid volumes to the temperature sufficient to grow the nanocrystal. The flow path can include a third region configured to cool the alternating gas and liquid volumes. The second region can have a length and the transporting can be at a rate sufficient to create a residence time within the second region of between 10 and 1,000 seconds, for example, less than 500 seconds or about 300 seconds. A residence time within the first region of between 1 and 30 seconds. The flow path can be a portion of a microfabricated device.

The method can include introducing the liquid into the flow path, and introducing the gas into the flow path, each being introduced at a temperature cooler than the temperature sufficient to grow the nanocrystal. The method can include introducing an additive while heating the alternating gas and liquid volumes to the temperature for the time sufficient to grow the nanocrystal or sampling at least one of the liquid volumes while heating the alternating gas and liquid volumes to the temperature for the time sufficient to grow the nanocrystal. Sampling can include monitoring an absorbance or an emission from the liquid volume or removing a portion of the liquid volumes from the flow path. The method can also include transporting alternating gas and liquid volumes through a second flow path and growing an overcoating of material on each of the plurality of nanocrystals.

In another aspect, a segmented-flow reactor for producing a population of nanocrystal includes a liquid introduction port, a gas introduction port, and a flow path fluidly connected to liquid introduction port and the gas introduction port, the flow path including a first region configured to generate recirculation in a liquid volume, a second region associated with a thermal source, and a third region configured to cool a material within the flow path. The first region and the second region can be thermally insulated from each other. The third region and the second region can be thermally insulated from each other. The flow path can be microfabricated on a substrate. The second region can include a meandering path.

In another aspect, a method of manufacturing a population of nanocrystals includes transporting alternating gas and liquid volumes through a flow path for a residence time to form the population of nanocrystals, the population of nanocrystals being monodisperse over a two-fold range of residence times. The population of nanocrystals is monodisperse over a three-fold range of residence times or a four-fold range of residence times.

The nanocrystal precursor can include an M-source and an X donor. The M-source can be an M-containing salt. M can be Cd, Zn, Mg, Hg, Al, Ga, In, or Tl. X can be O, S, Se, Te, N, P, As, or Sb. The nanocrystal precursor can include an amine, such as a primary amine. The M-containing salt can be a halide, carboxylate, carbonate, hydroxide, or diketonate, for example, cadmium acetylacetonate, cadmium iodide, cadmium bromide, cadmium chloride, cadmium hydroxide, cadmium carbonate, cadmium acetate, cadmium oxide, zinc acetylacetonate, zinc iodide, zinc bromide, zinc chloride, zinc hydroxide, zinc carbonate, zinc acetate, zinc oxide, magnesium acetylacetonate, magnesium iodide, magnesium bromide, magnesium chloride, magnesium hydroxide, magnesium carbonate, magnesium acetate, magnesium oxide, mercury acetylacetonate, mercury iodide, mercury bromide, mercury chloride, mercury hydroxide, mercury carbonate, mercury acetate, aluminum acetylacetonate, aluminum iodide, aluminum bromide, aluminum chloride, aluminum hydroxide, aluminum carbonate, aluminum acetate, gallium acetylacetonate, gallium iodide, gallium bromide, gallium chloride, gallium hydroxide, gallium carbonate, gallium acetate, indium acetylacetonate, indium iodide, indium bromide, indium chloride, indium hydroxide, indium carbonate, indium acetate, thallium acetylacetonate, thallium iodide, thallium bromide, thallium chloride, thallium hydroxide, thallium carbonate, or thallium acetate. The X donor includes a phosphine chalcogenide, a bis(silyl) chalcogenide, dioxygen, an ammonium salt, or a tris(silyl) pnictide.

The population of nanocrystals can be monodisperse. The population of nanocrystals can have an emission having a full width at half maximum of less than 30 nm.

The segmented-flow method can be used to synthesize nanocrystals of II-VI, III-V, or IV-VI compound semiconductors having geometries of spheres or other shapes, such as rods, wires, or cubes. The reactor can include separate stages for nucleation, growth and quench in a microfabricated device, for example, a chip, or a hybrid system including combinations of a microfabricated device and microcapillaries or tubes. The method can include introducing a gas stream into the reacting liquids to form a segmented gas-liquid flow in the reactor or on the chip at high temperature (e.g. between 100-350° C.) for the purpose of rapidly mixing reagents and initiating the nanocrystal formation reaction. The process can be monitored by on-chip detection (for example, of absorption/fluorescence). The method can include the ability to tune nanocrystal properties, for example, through feedback-control between one or more detectors and precursor and gas flow rates and temperature levels in reactor zones. Thermally isolated multiple temperature zones, for example a high reaction temperature zone between 100-350° C., a cool mixing zone, and a cool quench zone, can enable thermal quenching of the reaction (e.g. to a temperature between room temperature and 80° C.) and control of the nucleation and growth stages (e.g. by fabricating the unit in glass or in a glass-silicon hybrid where the different temperature zones are thermally insulated by, e.g., DRIE halo etched trenches).

In addition, the method can include controlling the introduction of reactants (e.g. precursors) at various locations along the reaction channel. A method of operating several units that use segmented gas-liquid flow and a gas-liquid separator in series can achieve a non-batch method for multistage synthesis of nanocrystals, for example, having overcoatings. Synthesis of multi-layer structures, for example, core-shell nanocrystals where core and shell consist of different materials/structures can be achieved in segmented flow systems. In addition, fluidic connections at the interface plate can be in a cool zone (e.g., room temperature −80° C.), which allow a variety of materials and bonding methods to be used in the region of material inlets to the system, and guiding them via the flow path through the appropriate temperature zones.

The details of one or more embodiments are set forth in the description below. Other features, objects, and advantages will be apparent from the description and from the claims.

DETAILED DESCRIPTION

Figure 1A:
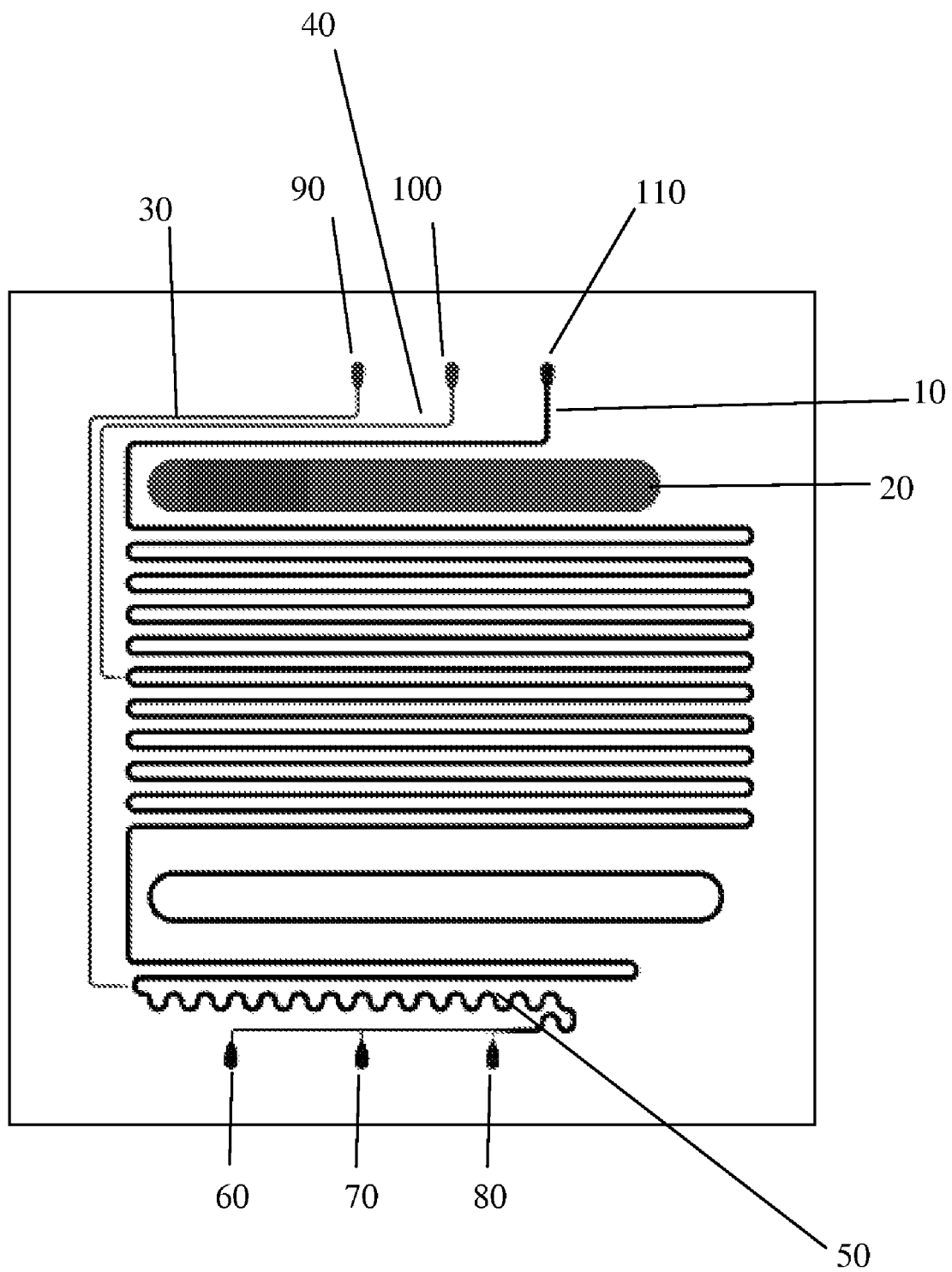
FIGS. 1A-1C are schematic drawings depicting a segmented flow reactors.

Microfluidic reactors enable a number of advantages over conventional chemical processes including enhanced control of heat and mass transfer, lower reagent consumption during optimization, and sensor integration for in-situ reaction monitoring (K. F. Jensen, *Chem. Eng. Sci.* 2001, 56, 293; K. Jähnisch et al., *Angew. Chem.* 2004, 116, 410; *Angew Chem. Int. Ed.* 2004, 43, 406). Reactors are usually fabricated from either silicon, glass, or polymers; those made of silicon or glass are advantageous because they can tolerate a broad range of chemistries and high temperatures. Microreactors for the large class of homogeneous liquid-phase reactions are often based on single-phase laminar flow designs in which reagent streams are brought into contact. However, such designs are limited in terms of slow diffusive reagent mixing and broad residence time distributions (RTDs). Recirculation within segments in a two-phase segmented flow approach (gas-liquid or liquid-liquid) overcomes such limitations by providing a mechanism of exchanging fluid elements located near the channel walls with those at the center (H. Song et al., *Angew. Chem.* 2003, 115, 792; *Angew Chem. Int. Ed.* 2003, 42, 768; A. Guenther et al., *Lap Chip* 2004, 4, 278; A. Guenther et al., *Langmuir* 2005, 21, 1547). This recirculatory motion has the dual effect of narrowing the RTD and improving reactant mixing. In contrast to single-phase designs, segmentation makes it possible to drive reactions to required yields over significantly shorter times owing to the enhanced mixing, while maintaining narrow RTDs.

Gas-liquid rather than liquid-liquid segmented flow offers the most versatility in terms of the range of chemistries that can be performed in a microfluidic system. Gas-liquid flow is preferable for performing reactions at elevated temperatures, as most solvents experience increased miscibility at higher temperatures. Moreover, it is possible to obtain uniform segmentation in gas-liquid flows over a very large range (over two orders of magnitude) of bubble velocities and therefore reaction timescales (A. Guenther et al., *Lap Chip* 2004, 4, 278; A. Guenther et al., *Langmuir* 2005, 21, 1547). Liquid-liquid segmented flow systems are operated over a much narrower range with typical droplet velocities varying over one order of magnitude (H. Song et al., *Angew. Chem.* 2003, 115, 792; *Angew Chem. Int. Ed.* 2003, 42, 768; I. Shestopalov, et al., *Lap Chip* 2004, 4, 316). Finally, in gas-liquid segmented flow, the reaction solution is present as a continuous liquid phase within the channel so that it is possible to inject additional reactants or withdraw reaction aliquots in a continuous, controllable manner. In liquid-liquid segmented flow, the reaction solution is usually the dispersed (droplet) phase; subsequent addition of reactants is challenging, as it requires synchronized merging of discrete droplets (I. Shestopalov, et al., *Lap Chip* 2004, 4, 316). The withdrawal of small aliquots without disturbing the flow is also difficult.

Continuous flow methods of manufacturing nanocrystals have been described. See, for example, U.S. patent application Ser. No. 10/921,306, and U.S. Pat. No. 6,682,596, each of which is incorporated by reference in its entirety. In a continuous flow system, reactions are performed at steady state, making it possible to achieve better control and reproducibility. Further benefits can be realized by scaling down the reactor dimensions to micrometers, thereby reducing the consumption of reagents during the optimization process and improving the uniformity of temperature and residence times within the reaction volume. A microfluidic reactor is attractive for nanocrystal synthesis because it is possible to rapidly and continuously screen through important reaction parameters, while using minimal amounts of reagents, until nanocrystals of the desired size and monodispersity are produced.

Figure 1B:
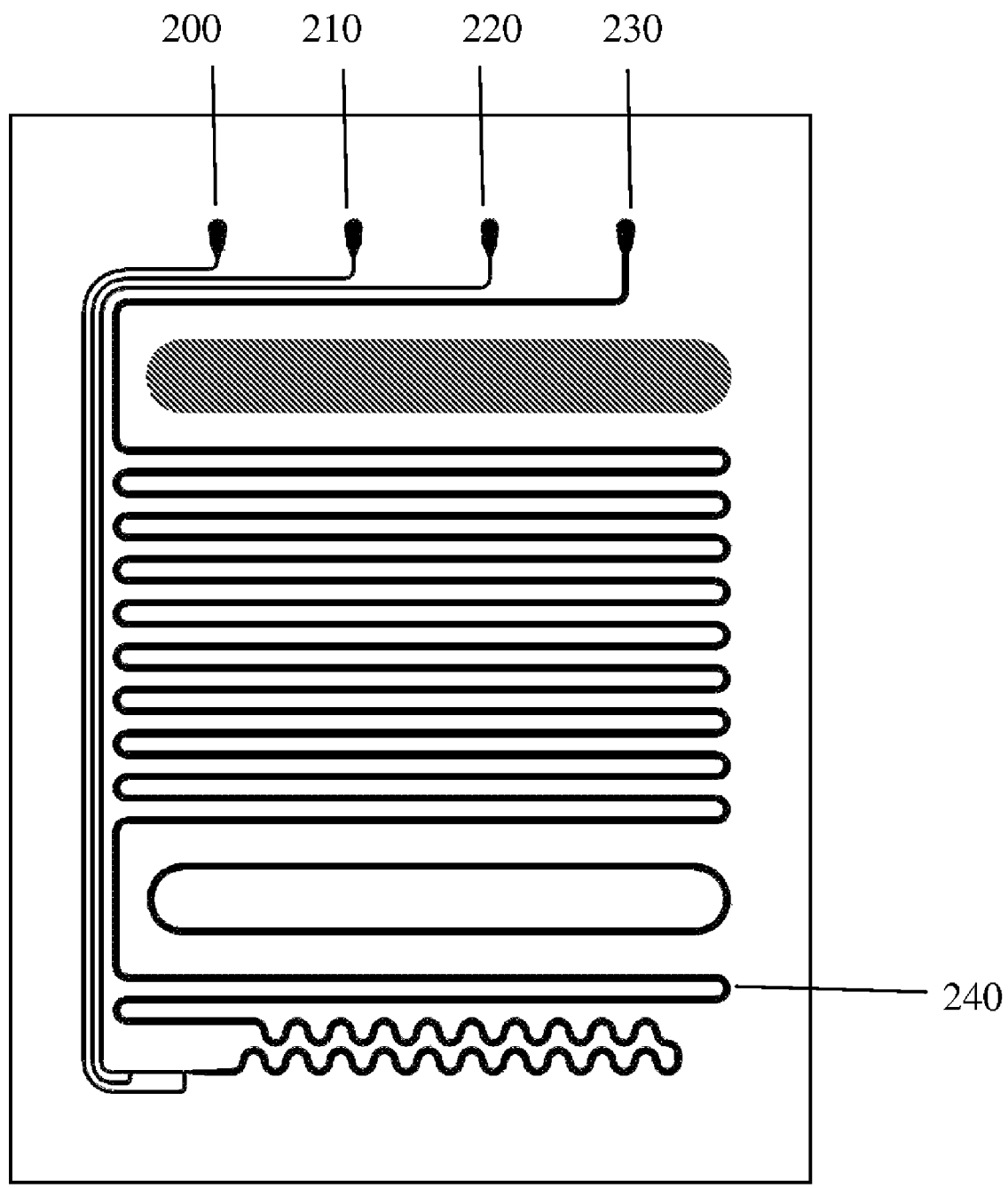
Figure 1C:
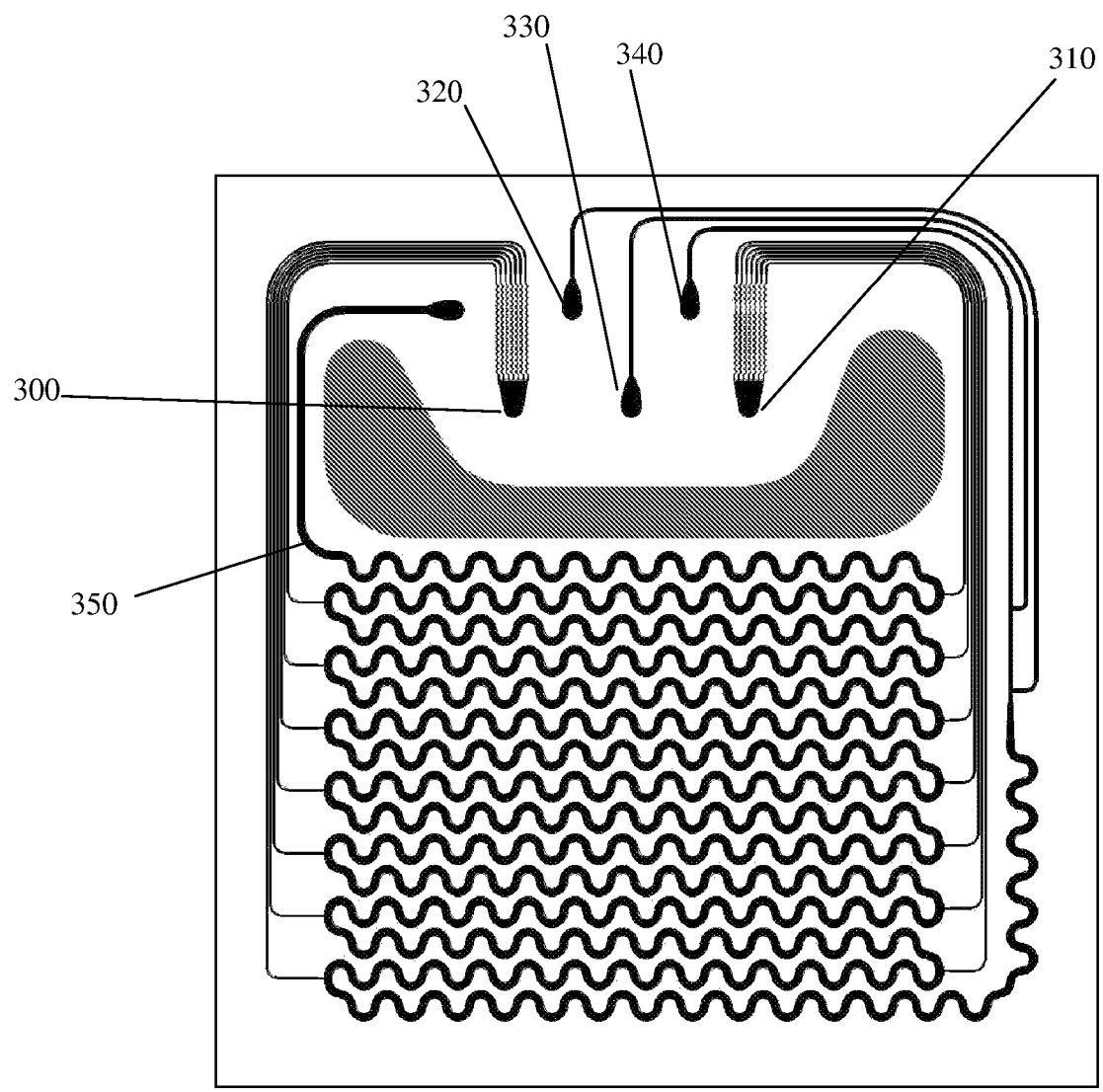

Referring to FIGS. 1A-1C, various reactor designs for segmented-flow manufacture of nanocrystals are shown. Segmented flow can be produced by introducing a gas at a gas flow rate into the flow path including a liquid flowing at a liquid flow rate. The combination of gas and liquid produces alternating gas and liquid volumes. The gas can be an inert gas such as nitrogen, argon or helium. The liquid can include a nanocrystal precursor, which is a reagent that can form the material of the nanocrystal. The material can be a metal, a semiconductor, or an insulator.

Colloidal semiconductor nanocrystals have been extensively studied for use in a variety of applications including fluorescent labels, electroluminescent devices, and lasers. Nanocrystals (2-10 nm diameter) are typically prepared in a batch process where the precursors are rapidly injected into a heated flask containing a mixture of solvents and coordinating ligands. The optical properties and average size of nanocrystals synthesized in the batch process can depend strongly on factors which are difficult to control such as injection process, local temperature and concentration fluctuations, rate of stirring, and rate of cooling. Single-phase flow reactors in which precursor solutions are delivered into a heated reaction section have addressed some of these issues. See, for example, J. deMello, A. deMello, *Lab on a Chip,* 4, 11N-15N (2004), which is incorporated by reference in its entirety, and references therein. However, a single-phase flow reactor has limitations in terms of the residence time distribution (RTD) and slow mixing by diffusion. The residence time is the time the material is in the first and second regions of the flow path. A gas-liquid segmented flow reactor allows for rapid and controlled mixing of precursors as well as narrow RTDs. In contrast to the case of single-phase flow, recirculation within the liquid segments provides a mechanism to exchange fluid elements located near the channel walls with those in the center. See, for example, A. Guenther, S. A. Khan, M. Thalmann, F. Trachsel, K. F. Jensen, *Lab on a Chip,* 4 (2004), which is incorporated by reference in its entirety. This recirculation has the dual effect of narrowing the RTD and improving mixing of the reagents—factors which have a strong influence on the ultimate size and size distribution of nanocrystals produced.

Referring to FIGS. 1A-1C, the reactor can have different configurations. The reactor can be etched or micromachined into a substrate that is not reactive with the nanocrystal precursor. Referring to FIG. 1A, deep channels 10 can be between 300-400 µm deep, area 20 is etched through entire substrate or otherwise removed from the substrate, and shallow channels 30, 40 can be about 50 µm deep. The reactor has a flow path that includes a region that mixes the contents of the liquid volume by recirculation. The recirculation pattern across the center of the flow path can be induced by meandering the flow path. The meandering flow path includes at least one inflection point 50. An example of an inflection point in the flow path is an s-shaped curve. The meandering flow path can include two or more, six or more, ten or more, twenty or more, or forty or more inflection points.

Referring to FIG. 1A, reagent solutions and segmenting gas are introduced from the bottom of the figure. Inlet regions (and fluidic connections) 60, 70, 80, are at reaction temperature. The fluids flow through the main channel 10, become cooled in the top region of the diagram, and then exit the reactor at outlet regions 90, 100, 110. Shallow draw-out channels 30, 40 can be used to take reaction aliquots at different locations. Temperature can be controlled by contacting the reactor with one or more thermal masses, such as a metal block containing heating and/or cooling elements.

Referring to FIG. 1B, the reactor can have a similar layout to that of FIG. 1A, except all of the inlets/outlets 200, 210, 220, 230 are on the cool side of the reactor. In this embodiment, the reagents and gas are introduced in the cool side and then brought separately to the heated main section of the reactor before being combined. The fluids flow through the main channel 240, become cooled in the top region of the diagram, and then exit the reactor at outlet region 230.

Referring to FIG. 1C, the reactor can include regions for introducing additional liquid reagents at many points along the main reaction channel (for example, fourteen narrow side channels 300, 310 are depicted in FIG. 1C). The main channel 350 is meandering, rather than straight, to ensure that the introduced reagents are uniformly mixed across the entire channel cross-section. Similar to the reactor of FIG. 1B, all of the inlets and outlets 320, 330, 340 are on the cool section (top of the figure).

In an embodiment, the reactors can be used for a multistage synthesis of nanocrystals. For example, one reagent including core nanocrystals can be introduced through one inlet, and the other reagent for overcoating the core can be introduced through another inlet or inlets. The core nanocrystals and the overcoating reagents can be carried to a common channel. In another embodiment, the core nanocrystals can be produced in the reactor and the overcoating reagents can be injected into the reactor to cover the core nanocrystals before exiting the reactor at outlet regions.

Figure 2:
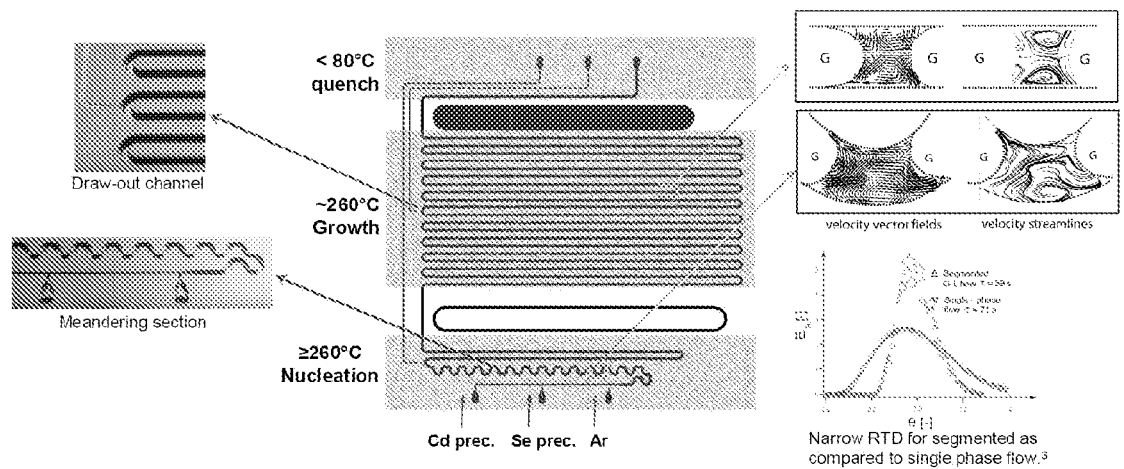
FIG. 2 is a schematic drawing and graphs depicting a segmented flow reactor and flow fields.
Figure 3:
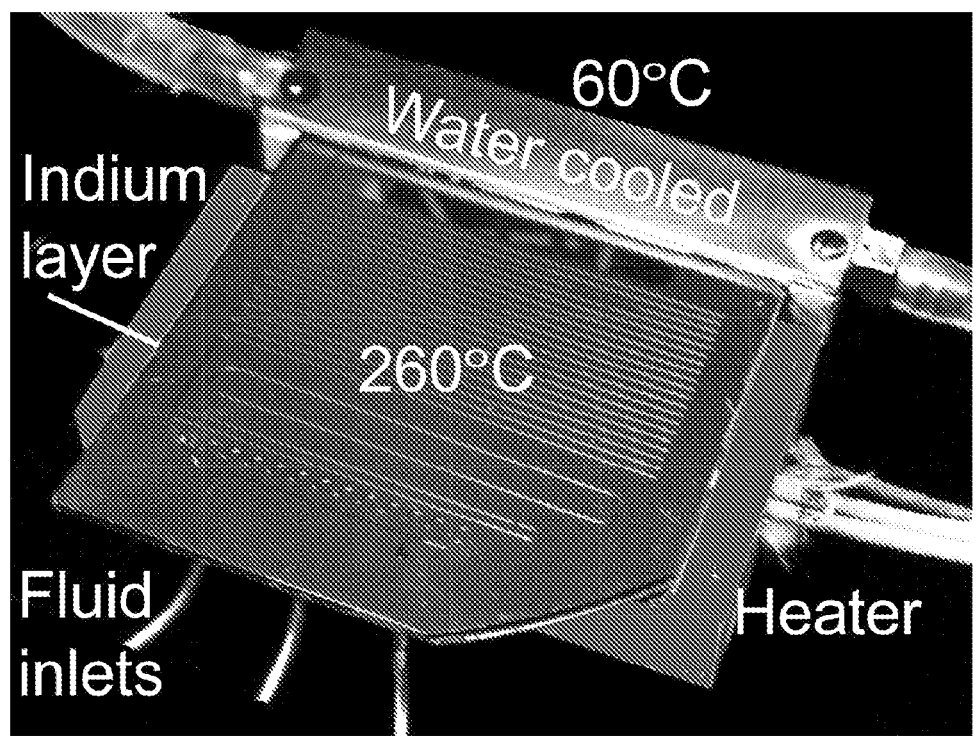
FIG. 3 is a photograph of a segmented flow reactor.

Referring to FIG. 2, a silicon reactor can include a 350 µm×400 µm×1 m reaction channel or flow path and two shallow side channels for collecting reaction aliquots in a draw-out channel. The entire device can be capped and sealed with an anodically bonded pyrex piece. The reactor has multiple temperature zones, for example, inlet and center sections heated to reaction high temperature (260° C.) and the outlet section cooled (<80° C.) to quench the reaction. The inlet, main channel, and outlet sections are thermally isolated from each other by a deep trench and a halo etch region. Recirculation in the liquid results in rapid mixing and narrow RTD. Illustration of recirculation in liquid segments for the straight and meandering channel geometries (flow from left to right, bulk liquid velocity subtracted) is shown as velocity vector fields and velocity streamlines that can be obtained by particle imaging velocimetry (PIV), for example, of dye-doped microspheres dispersed in ethanol or emission from nanocrystals. The air-ethanol segmented flow was carried out in a polydimethylsiloxane reactor at flow rates similar to those of the nanocrystal synthesis Meandering section ensures uniform initial mixing across the centerline. Precursor solutions can be delivered separately into the reactor, as shown. A gas stream, for example, an argon stream, is introduced further downstream to form a segmented gas-liquid flow. The segmented flow has a narrow RTD compared to a single phase flow reactor. An experimental reactor is shown in FIG. 3.

In general, the method of manufacturing a nanocrystal is a colloidal growth process. See, for example, U.S. Pat. Nos. 6,322,901 and 6,576,291, each of which is incorporated by reference in its entirety. Colloidal growth occurs by rapidly injecting an M-containing compound and an X donor into a hot coordinating solvent. The coordinating solvent can include an amine. The M-source can be a metal, an M-containing salt, or an M-containing organometallic compound. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M-source or X donor, the growth period can be shortened.

The M-containing salt can be a non-organometallic compound, e.g., a compound free of metal-carbon bonds. M is cadmium, zinc, magnesium, mercury, aluminum, gallium, indium, thallium, or lead. The M-containing salt can be a metal halide, metal carboxylate, metal carbonate, metal hydroxide, metal oxide, or metal diketonate, such as a metal acetylacetonate. The M-containing salt is less expensive and safer to use than organometallic compounds, such as metal alkyls. For example, the M-containing salts are stable in air, whereas metal alkyls are generally unstable in air. M-containing salts such as 2,4-pentanedionate (i.e., acetylacetonate (acac)), halide, carboxylate, hydroxide, oxide, or carbonate salts are stable in air and allow nanocrystals to be manufactured under less rigorous conditions than corresponding metal alkyls.

Suitable M-containing salts include cadmium acetylacetonate, cadmium iodide, cadmium bromide, cadmium chloride, cadmium hydroxide, cadmium carbonate, cadmium acetate, cadmium oxide, zinc acetylacetonate, zinc iodide, zinc bromide, zinc chloride, zinc hydroxide, zinc carbonate, zinc acetate, zinc oxide, magnesium acetylacetonate, magnesium iodide, magnesium bromide, magnesium chloride, magnesium hydroxide, magnesium carbonate, magnesium acetate, magnesium oxide, mercury acetylacetonate, mercury iodide, mercury bromide, mercury chloride, mercury hydroxide, mercury carbonate, mercury acetate, aluminum acetylacetonate, aluminum iodide, aluminum bromide, aluminum chloride, aluminum hydroxide, aluminum carbonate, aluminum acetate, gallium acetylacetonate, gallium iodide, gallium bromide, gallium chloride, gallium hydroxide, gallium carbonate, gallium acetate, indium acetylacetonate, indium iodide, indium bromide, indium chloride, indium hydroxide, indium carbonate, indium acetate, thallium acetylacetonate, thallium iodide, thallium bromide, thallium chloride, thallium hydroxide, thallium carbonate, or thallium acetate.

Alkyl is a branched or unbranched saturated hydrocarbon group of 1 to 100 carbon atoms, preferably 1 to 30 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. Optionally, an alkyl can contain 1 to 6 linkages selected from the group consisting of —O—, —S—, -M- and —NR— where R is hydrogen, or $C_1$-$C_8$ alkyl or lower alkenyl.

Prior to combining the M-source with the X donor, the M-source can be contacted with a coordinating solvent to form an M-containing precursor. Typical coordinating solvents include alkyl phosphines, alkyl phosphine oxides, alkyl phosphonic acids, or alkyl phosphinic acids; however, other coordinating solvents, such as pyridines, furans, and amines may also be suitable for the nanocrystal production. Examples of suitable coordinating solvents include pyridine, tri-n-octyl phosphine (TOP) and tri-n-octyl phosphine oxide (TOPO). Technical grade TOPO can be used. The coordinating solvent can include a 1,2-diol or an aldehyde. The 1,2-diol or aldehyde can facilitate reaction between the M-source and the X donor and improve the growth process and the quality of the nanocrystal obtained in the process. The 1,2-diol or aldehyde can be a $C_6$-$C_{20}$ 1,2-diol or a $C_6$-$C_{20}$ aldehyde. A suitable 1,2-diol is 1,2-hexadecanediol and a suitable aldehyde is dodecanal.

The X donor is a compound capable of reacting with the M-source to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, elemental sulfur, bis(trimethylsilyl) selenide (($TMS)_2Se$), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride (($TMS)_2Te$), sulfur, bis(trimethylsilyl) sulfide (($TMS)_2S$), a trialkyl phosphine sulfide such as (tri-n-octylphosphine) sulfide (TOPS), tris(dimethylamino) arsine, an ammonium salt such as an ammonium halide (e.g., $NH_4Cl$), tris(trimethylsilyl) phosphide (($TMS)_3P$), tris(trimethylsilyl) arsenide (($TMS)_3As$), or tris(trimethylsilyl) antimonide (($TMS)_3Sb$). In certain embodiments, the M donor and the X donor can be moieties within the same molecule.

The nanocrystal manufactured from an M-source grows in a controlled manner when the coordinating solvent includes an amine. The amine in the coordinating solvent can contribute to the quality of the nanocrystal obtained from the M-source and X donor. Preferably, the coordinating solvent is a mixture of the amine and an alkyl phosphine oxide in a mole ratio of 10:90, more preferably 30:70 and most preferably 50:50. The combined solvent can decrease size dispersion and can improve photoluminescence quantum yield of the nanocrystal. The preferred amine is a primary alkyl amine or a primary alkenyl amine, such as a $C_2$-$C_{20}$ alkyl amine, a $C_2$-$C_{20}$ alkenyl amine, preferably a $C_8$-$C_{18}$ alkyl amine or a $C_8$-$C_{18}$ alkenyl amine. For example, suitable amines for combining with tri-octylphosphine oxide (TOPO) include 1-hexadecylamine, or oleylamine. When the 1,2-diol or aldehyde and the amine are used in combination with the M-source to form a population of nanocrystals, the photoluminescence quantum efficiency and the distribution of nanocrystal sizes are improved in comparison to nanocrystals manufactured without the 1,2-diol or aldehyde or the amine.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, both CdSe and CdS can be tuned in the visible region and InAs can be tuned in the infrared region.

A population of nanocrystals can have a narrow size distribution. The population can be monodisperse and can exhibit less than a 15% rms deviation in diameter of the nanocrystals, preferably less than 10%, more preferably less than 5%. Spectral emissions in a narrow range of between 10 and 100 nm full width at half max (FWHM) can be observed. Semiconductor nanocrystals can have emission quantum efficiencies of greater than 2%, 5%, 10%, 20%, 40%, 60%, 70%, or 80%.

The semiconductor forming the core of the nanocrystal can include Group II-VI compounds, Group II-V compounds, Group III-VI compounds, Group III-V compounds, Group IV-VI compounds, Group I-III-VI compounds, Group II-IV-VI compounds, and Group II-IV-V compounds, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof.

The quantum efficiency of emission from nanocrystals having a core of a first semiconductor material can be enhanced by applying an overcoating of a second semiconductor material such that the conduction band of the second semiconductor material is of higher energy than that of the first semiconductor material, and the valence band of the second semiconductor material is of lower energy than that of the first semiconductor material. As a result, charge carriers, i.e., electrons and holes, are confined in the core of the nanocrystal when in an excited state. Alternatively, the conduction band or valence band of overcoating material can have an energy intermediate between the energies of the conduction and valence bands of the core material. In this case, one carrier can be confined to the core while the other is confined to the overcoating material when in an excited state. See, for example, U.S. patent application Ser. No. 10/638,546, which is incorporated by reference in its entirety. The core can have an overcoating on a surface of the core. The overcoating can be a semiconductor material having a composition different from the composition of the core, and can have a band gap greater than the band gap of the core. The overcoat of a semiconductor material on a surface of the nanocrystal can include a Group II-VI compounds, Group II-V compounds, Group III-VI compounds, Group III-V compounds, Group IV-VI compounds, Group I-III-VI compounds, Group II-IV-VI compounds, and Group II-IV-V compounds, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof.

The outer surface of the nanocrystal can include a layer of compounds derived from the coordinating agent used during the growth process. The surface can be modified by repeated exposure to an excess of a competing coordinating group to form an overlayer. For example, a dispersion of the capped nanocrystal can be treated with a coordinating organic compound, such as pyridine, to produce crystals which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal.

Monodentate alkyl phosphines (and phosphine oxides; the term phosphine below will refer to both) can passivate nanocrystals efficiently. When nanocrystals with conventional monodentate ligands are diluted or embedded in a non-passivating environment (i.e., one where no excess ligands are present), they tend to lose their high luminescence. Typical are an abrupt decay of luminescence, aggregation, and/or phase separation. In order to overcome these limitations, polydentate ligands can be used, such as a family of polydentate oligomerized phosphine ligands. The polydentate ligands show a high affinity between ligand and nanocrystal surface. In other words, they are stronger ligands, as is expected from the chelate effect of their polydentate characteristics.

Oligomeric phosphines have more than one binding site to the nanocrystal surface, which ensures their high affinity to the nanocrystal surface. See, for example, for example, U.S. Ser. No. 10/641,292, filed Aug. 15, 2003, and U.S. Ser. No. 60/403,367, filed Aug. 15, 2002, each of which is incorporated by reference in its entirety. The oligomeric phosphine can be formed from a monomeric, polyfunctional phosphine, such as, for example, tris(hydroxypropyl)phosphine, and a polyfunctional oligomerization reagent, such as, for example, a diisocyanate. The oligomeric phosphine can be contacted with an isocyanate of formula R'-L-NCO, wherein L is $C_2$-$C_{24}$ alkylene, and R' has the formula

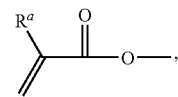

R' has the formula

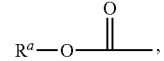

or R' is hydrogen, wherein $R^a$ is hydrogen or $C_1$-$C_4$ alkyl.

An overcoating process is described, for example, in U.S. Pat. No. 6,322,901, incorporated herein by reference in its entirety. By adjusting the temperature of the reaction mixture during overcoating and monitoring the absorption spectrum of the core, overcoated materials having high emission quantum efficiencies and narrow size distributions can be obtained. Alternatively, an overcoating can be formed by exposing a core nanocrystal having a first composition and first average diameter to a population of nanocrystals having a second composition and a second average diameter smaller than the first average diameter.

Size distribution during the growth stage of the reaction can be estimated by monitoring the absorption line widths of the particles. Modification of the reaction temperature in response to changes in the absorption spectrum of the particles allows the maintenance of a narrow particle size distribution during growth. Reactants can be added to the nucleation solution during crystal growth to grow larger crystals. By stopping growth at a particular nanocrystal average diameter, a population having an average nanocrystal diameter of less than 150 Å can be obtained. A population of nanocrystals can have an average diameter of 15 Å to 125 Å. The emission spectra of the nanocrystals can be tuned continuously over the wavelength range of 300 nm to 5 microns, or for example, when CdSe or CdTe is the core material, from 400 nm to 800 nm. IR-emitting semiconductor nanocrystals can be prepared according to methods described in, for example, U.S. patent application Ser. No. 10/638,546, which is incorporated by reference in its entirety.

The particle size distribution can be further refined by size selective precipitation with a poor solvent for the nanocrystals, such as methanol/butanol as described in U.S. Pat. No. 6,322,901, incorporated herein by reference in its entirety. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystals in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean diameter, preferably 10% rms deviation or less, and more preferably 5% rms deviation or less.

Transmission electron microscopy (TEM) can provide information about the size, shape, and distribution of the nanocrystal population. Powder X-ray diffraction (XRD) patterns can provide the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum, if calibrated by a direct measurement of diameter, such as XRD or TEM.

The nanocrystals can be suitable for a variety of applications, including those disclosed in U.S. Pat. Nos. 6,251,303, 6,326,144, and 6,617,583, each of which is incorporated herein by reference in its entirety. For example, the nanocrystals can be used in optoelectronic devices including electroluminescent devices such as light emitting diodes (LEDs) or alternating current thin film electroluminescent devices (ACTFELDs).

CdSe is probably the most well characterized colloidal semiconductor nanocrystal system because its effective band gap can be tuned over the majority of the visible region. However, existing preparations are generally not amenable to a continuous flow system. In the most widely used preparation of high quality CdSe nanocrystals, dimethyl cadmium and tri-n-octylphosphine selenide (TOPSe) are rapidly injected into a hot solvent consisting of a mixture of tri-n-octylphospine (TOP) and tri-n-octylphosphine oxide (TOPO). See, for example, Murray et al., *J. Am. Chem. Soc.* 1993, 115, 8706-8715. The solvent also serves as the source of surface ligands for the growing nanocrystals. This method ensures that nucleation occurs very rapidly, followed by slower particle growth on existing nuclei, and the particles produced can be reasonably monodisperse and crystalline. Several difficulties arise when this chemistry is implemented in a continuous flow system, the most obvious one being that the solvent can be a solid at room temperature. Also, when $(CH_3)_2Cd$ is used as a precursor, gas is rapidly evolved in the reaction, which can make it difficult to achieve reproducible reactor residence times. Finally, at the high reaction temperatures, TOPO can decompose and lead to clogging of the reactor channel, a challenge that is only exacerbated as the channel dimensions are made smaller. Therefore, it was necessary for us to develop a new chemistry for CdSe nanocrystal synthesis that is more compatible with a microfluidic flow system. Guided by several recent reports on the preparation of semiconductor nanocrystals, cadmium oleate and TOPSe were chosen as the Cd and Se sources, respectively. See, for example, Murray et al., *IBM J. Res. & Dev.* 2001, 45, 47-56, Qu et al., *Nano Lett.* 2001, 1, 333-337, Peng et al., *J. Am. Chem. Soc.* 2001, 123, 183-184, and Bawendi et al., US Patent Application 20020071952, each of which is incorporated by reference in its entirety. These precursors can be dissolved in a high-boiling solvent system consisting of squalane, oleyl amine, and TOP. Advantageously, this choice of precursors and solvent reduces or eliminates problems of outgassing and clogging within the reactor channel, making it possible to use a simple capillary reactor to prepare CdSe nanocrystals with excellent size distributions and high photoluminescence (PL) quantum efficiencies. The segmented flow system can be used to tune the band-edge absorbance, for example, by varying the average nanocrystal size, over a substantial range.

Absorbance spectra can be taken of the nanocrystals by removing samples or by observing emission within the reactor. By systematically varying the temperature, flow rate, and concentration it was possible to finely tune the size of nanocrystals produced in the reactor. Average nanocrystal radii can be determined from the position of the band-edge absorbance peak and calibration curves based on TEM and X-ray scattering results. See, for example, Murray et al., *J. Am. Chem. Soc.* 1993, 115, 8706-8715, Mattoussi et al., *Phys. Rev. B* 1998, 58, 7850-7863, and Kuno, Ph.D. thesis, Massachusetts Institute of Technology, 1998, each of which is incorporated by reference in its entirety. The reaction yield and number of nuclei/volume can be determined from the optical density and absorbance cross-section at 350 nm as previously reported. See, for example, Leatherdale et al., *J. Phys. Chem. B* 2002, 106, 7619-7622.

EXAMPLES

The precursor solutions used for the synthesis were identical to those reported previously with some minor modifications. See, B. K. H. Yen, N. E. Stott, K. F. Jensen, M. G. Bawendi, *Adv. Materials,* 15, 1858-1862 (2003), which is incorporated by reference in its entirety. See also B. K. H. Yen et al., *Angew. Chem. Int. Ed.* 2005, 44, 5447-5545. Briefly, a cadmium oleate solution was prepared by degassing cadmium acetylacetonate, oleic acid, and squalane at elevated temperature. Oleyl amine was then added to the solution. The Se precursor solution consisted of trioctylphosphine selenide (TOPSe) dissolved in trioctylphosphine and squalane. The two precursor solutions were degassed thoroughly at 90° C. before loading into separate syringes.

Samples for the measurement of absorbance and PL spectra were prepared by diluting the raw nanocrystal solutions in hexanes. Optical absorption spectra were acquired with a Hewlett-Packard 8452 diode array spectrometer. Photoluminescence spectra were acquired with an Ocean Optics SD2000 fiber-optic spectrometer and a handheld UV lamp as an excitation source. Reaction yields were determined from the optical density at λ=350 nm and the measured absorbance cross-section for CdSe nanocrystals (C. A. Leatherdale et al., *J. Phys. Chem. B* 2002, 106, 7619).

The silicon reactor, fabricated using standard micromachining procedures, accommodated an approximately 1 m long reaction channel (hydraulic diameter ~380 µm) and two shallow side channels ($L_{sample}$) for collecting reaction aliquots. A 0.5 µm thick oxide was thermally grown on the Si surface, and the entire device was capped and sealed with an anodically bonded pyrex wafer (thickness 500 or 760 µm). The inlet, main channel, and outlet sections were thermally isolated from each other by a ~400 µm deep trench and a halo etch region. The reactor had the configuration shown in FIG. 1A. For a typical synthesis, the inlet and center sections were maintained at reaction temperature (260 to 300° C.) and the outlet section was cooled (~60° C.) to quench the reaction. Heating was provided by contacting the reaction section of the device with a heated aluminum block. Cooling of the quenching region was achieved with a water chilled aluminum block. The Cd and Se precursor solutions were at room temperature and delivered separately into the heated reactor ($L_1$ and $L_2$) with a syringe pump. An argon gas stream (G) was introduced further downstream to form a segmented gas-liquid flow. Single-phase flow experiments were performed without gas being introduced. In this case, a miniature convective mixer inline between the pump and reactor ensured that the precursors were completely mixed before reaching the reactor inlet. Optical absorbance and photoluminescence (PL) spectra were taken on raw nanocrystal solutions diluted in hexane. The experimental system is depicted in FIG. 1A.

Figure 4A:
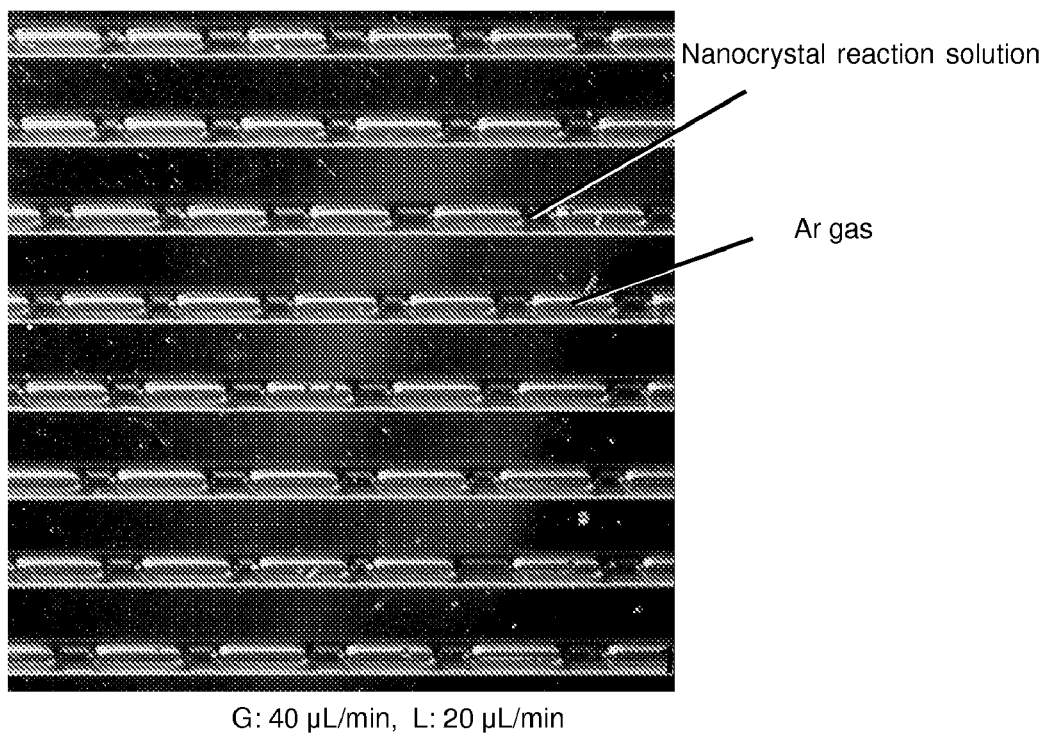
FIG. 4A is a photograph of a section of a reaction zone depicting segmented flow.
Figure 4B:
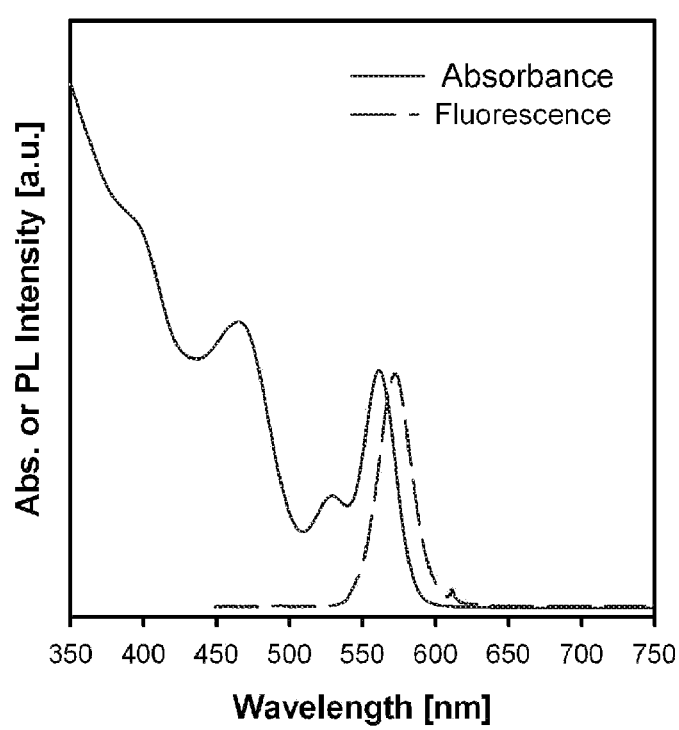
FIG. 4B is a graph depicting absorbance (solid) and photoluminescence (dashed) spectra of nanocrystals prepared under the segmented flow conditions shown in FIG. 4A.

The reactor design makes it possible to achieve rapid initial mixing of the precursors, controlled nanocrystal growth, and quenching of the reaction on chip. Recirculation within the liquid slugs or volumes rapidly mixes and heats the precursors, thereby initiating the reaction. The fluids initially pass through a meandering section of the channel to ensure good mixing across the centerline before reaching a longer straight-channel section where the majority of the particle growth occurs. The reaction is stopped when the fluids enter the cooled outlet region of the device. FIG. 4A is a photograph of a section of the reaction zone during a typical synthesis of CdSe nanocrystals at T=260° C., a gas (G; light) flow rate of 40 µL/min, a liquid (L; dark) flow rate of 20 µL/min, and a mean residence time approximately 100 s. FIG. 4B is a graph of absorbance (solid) and photoluminescence (dashed) spectra of nanocrystals prepared under the conditions described for FIG. 4A. Under conditions for a typical synthesis (gas and liquid flow rates: 40 and 20 µL/min at room temperature) the resulting gas and liquid segments are very uniform (FIG. 4A). The as-prepared nanocrystal samples possess narrow size distributions as indicated by absorbance and photoluminescence (PL) spectra (FIG. 4B). The principal band edge and several higher transitions are clearly resolved in the absorbance spectrum, and photoluminescense line width is also very narrow (FWHM <30 nm). In general, the gas and liquid segments or volumes are very uniform. Several transitions are resolved in absorbance spectrum, indicative of narrow size distribution. Nanocrystal samples are bright, and PL spectrum is narrow and symmetric (FWHM <30 nm). Quality of the samples produced is comparable to those synthesized in the batch method.

Figure 5A:
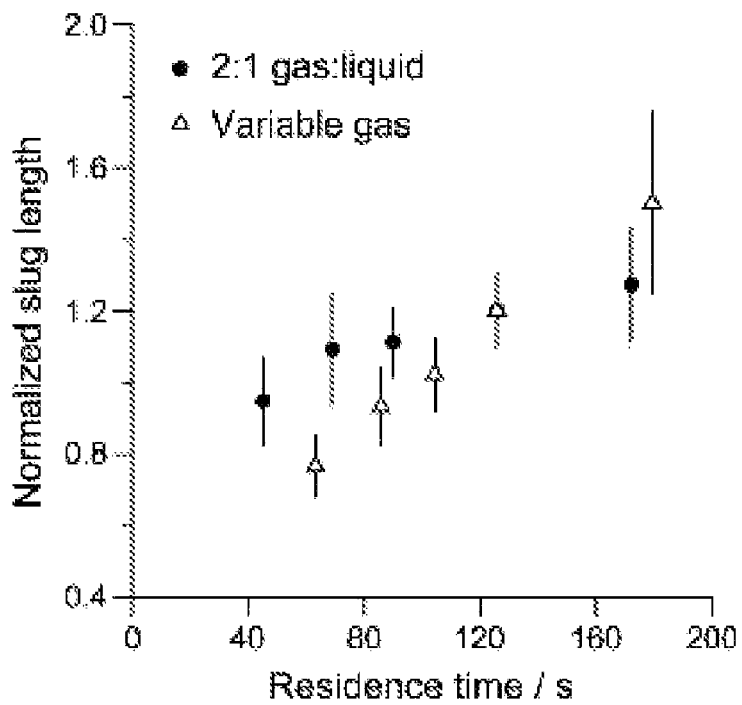
FIG. 5A is a graph depicting the ratio of average liquid slug length to hydraulic diameter over a range of flow rates (residence times).

Slug statistics were systematically examined over a range of flow conditions by varying either the total fluid flow rate under conditions of constant gas-to-liquid flow rate ($v_g/v_l$) or by varying $v_g$ under conditions of constant $v_l$ (the reported gas flow rates do not include the significant, although steady, gas leakage from the syringe and tubing fittings leading up to the reactor. Gas leakage occurred even with nominally gas-tight syringes. However, the slug lengths were measured directly from images taken of the reactor channel, so the reported mean residence times are accurate). The resulting liquid slug-length distributions over this range of residence times are shown in FIG. 5A. FIG. 5A is a graph depicting the ratio of average liquid slug length to hydraulic diameter (≈380 µm) over a grange of flow rates (residence times, $t_r$) at 260° C.; error bars indicate the standard deviation of the liquid length for a given flow condition; the filled circles indicate gas/liquid flow rates of: 100/50, 80/40, 60/30, 40/20, and 30/15 µLmin$^{-1}$ (ratio kept equal to 2); the triangles indicate flow rates of: 100/20, 80/20, 60/20, 40/20, 30/20 µLmin$^{-1}$ (liquid flow rate kept at 20 µLmin$^{-1}$). The liquid lengths are on the order of the channel hydraulic diameter and typically have a relative standard deviation of ≦10%.

This dispersion in the slug lengths is small enough so that it does not contribute to the overall RTD (the standard deviation of the mean of the liquid slug length gives rise to an uncertainty in the residence time: $\sigma_{t_r}/t_r = \sigma_l/(l_{avg} \sqrt{N})$) in which $t_r$ is the residence time, l is the length of an individual slug, and N is the number of liquid slugs in the reactor (typically ≈300). As $\sigma_l/l_{avg} \approx 10\%$, $\sigma_{t_r}/t_r < 0.6\%$. In other words, the liquid slug length distribution does not contribute significantly to the overall residence time dispersion).

Figure 5B:
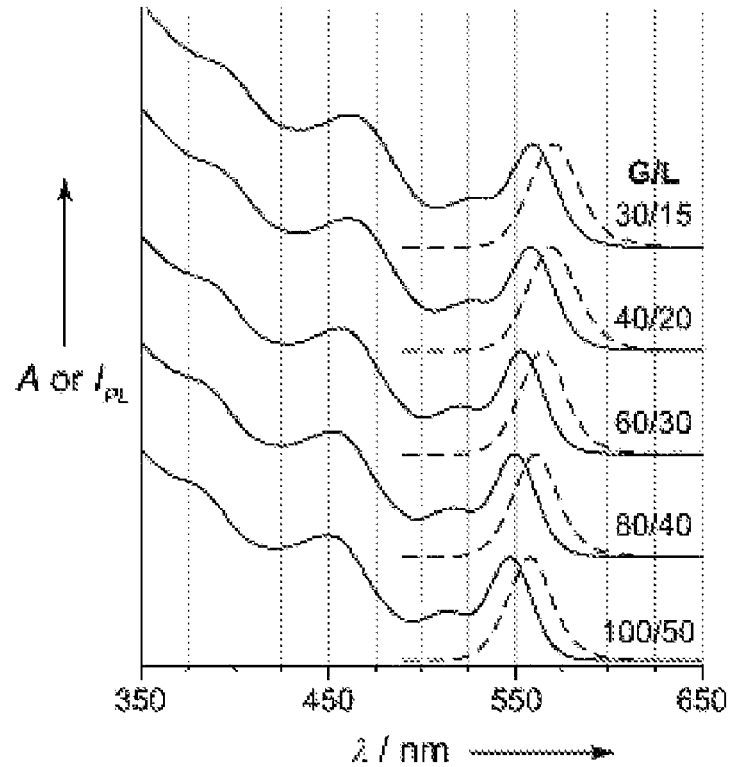
FIG. 5B is a graph depicting absorbance (solid) and photoluminescence (PL) (dashed) spectra for nanocrystals prepared under different flow conditions.

The resulting spectra of the nanocrystal samples indicate narrow size distributions (FIG. 5B) and are similar to the best samples obtained by the batch process. The band-edge absorbance and several higher transitions are clearly resolved, and the PL line widths remain narrow over the entire range of flow rates. In the figure, the PL full-width-at-half-maximum (fwhm) varies between 28 and 31 nm (112 and 119 meV, depending on wavelength). FIG. 5B is a graph depicting absorbance (solid) and photoluminescence (PL) (dashed) spectra for nanocrystals prepared under the flow conditions represented by the filled circles in FIG. 5A.

Figure 6:
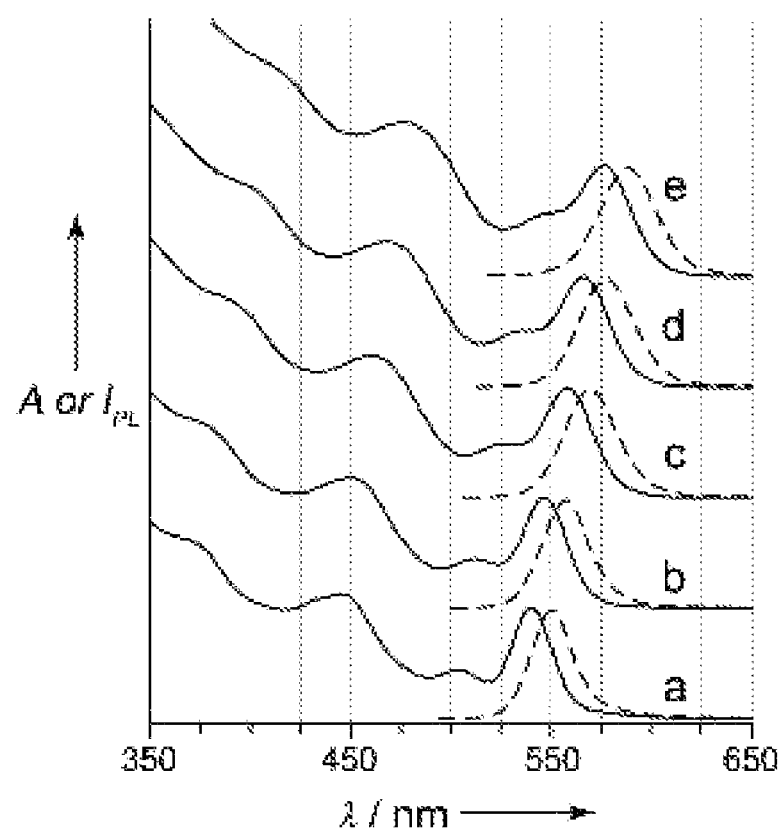
FIG. 6 is a graph depicting absorbance (solid) and photoluminescence (PL) (dashed) spectra for nanocrystals obtained by varying the precursor feed ratio.

In FIG. 5B, the nanocrystals were prepared with a constant precursor composition and represent a fairly limited spectral range (<10 nm variation in band-edge position). As discussed previously, it was found that size tuning is more readily accomplished through variation in the ratio Se/Cd rather than the reaction time (B. K. H. Yen et al., *Adv. Mater.* 2003, 15, 1858). FIG. 6 illustrates such an effect from varying the Cd and Se precursor flow rates while the keeping the total liquid and gas flow rates constant (at 20 and 40 µLmin$^{-1}$, respectively). In contrast to FIG. 5B, a change in the ratio Se/Cd from 15 to 1.7 made it possible to tune the effective band gap of the nanocrystals over a much larger spectral range of ≈40 nm yet maintain narrow size distributions. The average nanocrystal radius decreases with an increase in the Se/Cd ratio owing to the strong dependence of the nucleation rate on the precursor ratio. The samples represented in FIG. 6 were produced by using the same temperature (260° C.) and mean residence time (≈140 s). By varying the temperature and reaction time in addition to the precursor feed ratios, it would be possible to tune the effective band gap over an even larger spectral window. FIG. 6 is a graph depicting absorbance (solid) and photoluminescence (PL) (dashed) spectra for nanocrystals obtained by varying the precursor feed ratio (T=260° C.). The total gas and liquid flow rates were kept constant ($v_{l(Se)} + v_{l(Cd)} = 20$ µLmin$^{-1}$, $v_{g(Ar)} = 40$ µLmin$^{-1}$). Spectra correspond to the flow rates ($v_{l(Se)}/v_{l(Cd)}$) and resulting concentration ratios (Se/Cd) of a) 3.0 and 15, respectively; b) 1.67 and 8.3; c) 1.0 and 5.0; d) 0.60 and 3.0; e) 0.33 and 1.7.

In general, it was found that spectra of nanocrystals produced in single-phase operation ($v_g=0$) were significantly broader than those obtained with gas-liquid flow. The poorer performance observed in the single-phase case results primarily from the combination of two effects: initial mixing and broad RTD. In single-phase flow, the two precursor streams combine slowly by diffusion, in contrast to the convective mixing induced by the introduction of a segmenting gas (the mixing time for segmented flow in this system is ≈1% of the average residence time. For the single-phase case, the diffusive mixing time can be >50% of the average residence time depending on the flow rate). Slow initial mixing makes it difficult to realize a rapid nucleation burst, and the resulting nanocrystal samples are polydisperse. Once the reagents are completely mixed, the RTD effect is still present; nanocrystals near the channel wall spend a longer time in the reactor than those in the channel center. In segmented flow, recirculation within the liquid brings fluid from the channel wall to the center which facilitates rapid mixing, lower dispersion in residence times, and therefore narrower nanocrystal size distributions.

Figure 7A:
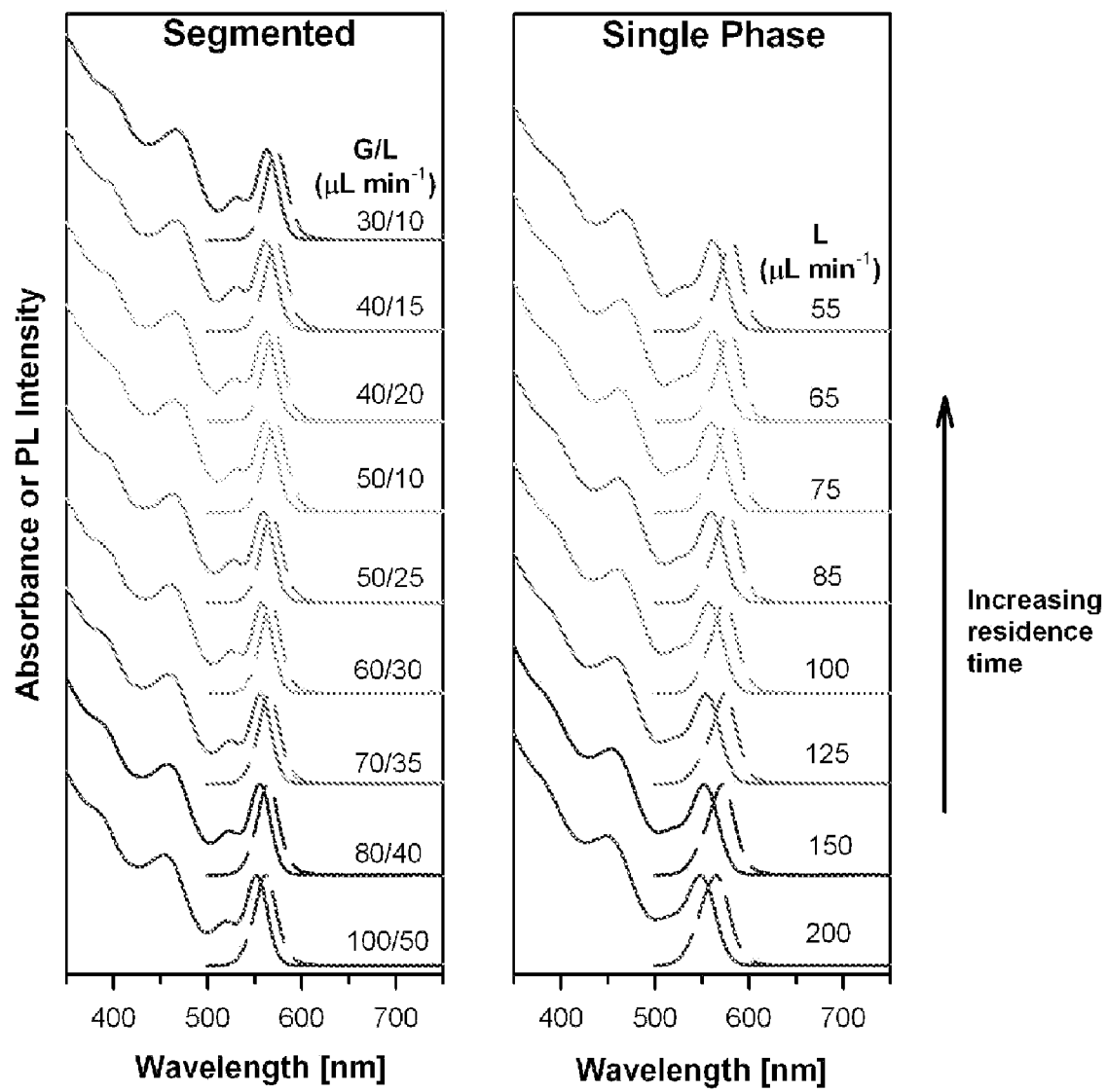
FIG. 7A is a set of graphs depicting absorbance and photoluminescence spectra of nanocrystals produced under segmented flow conditions at various residence times and single phase flow conditions a various residence times.
Figure 7B:
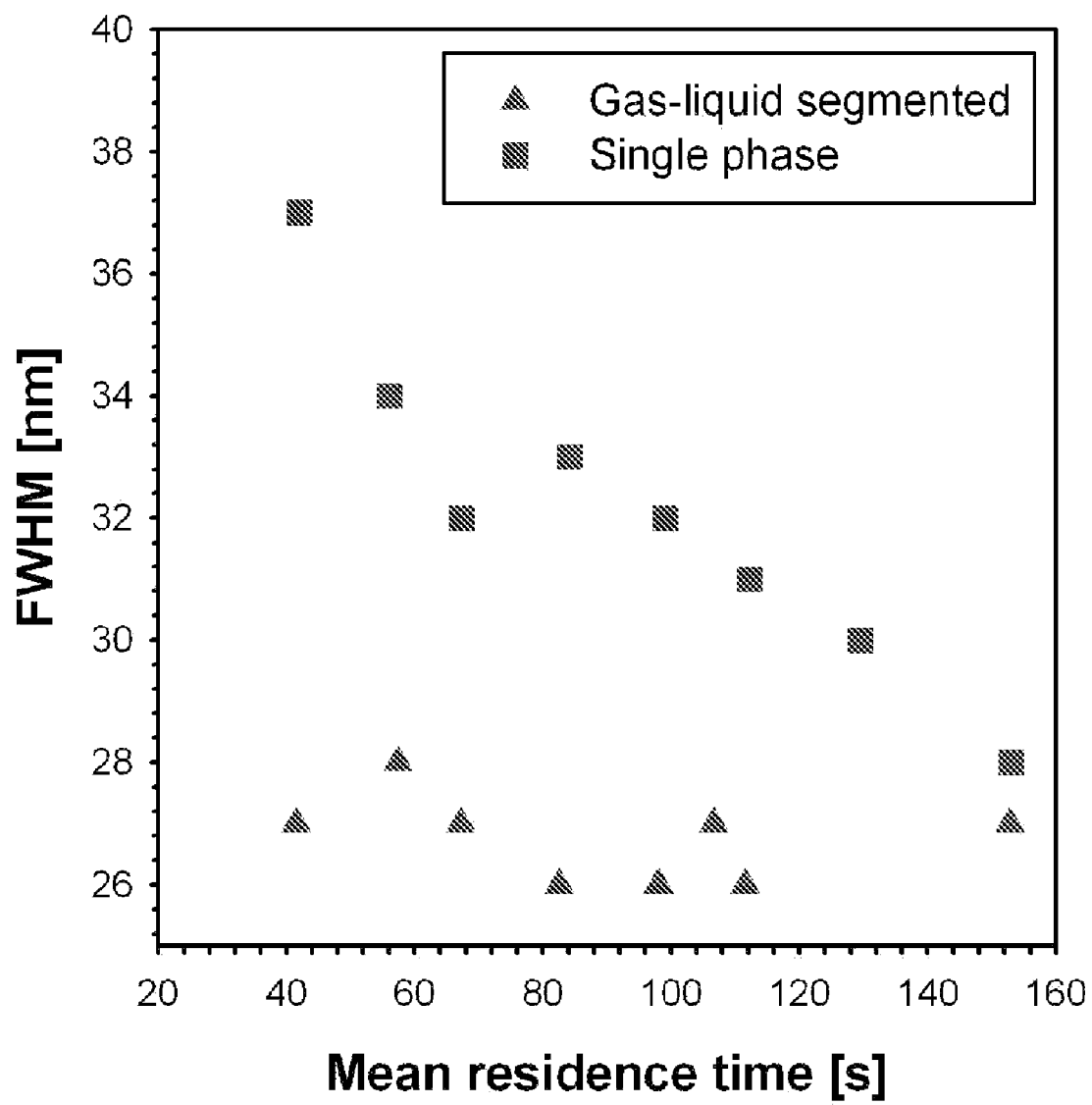
FIG. 7B is a graph depicting the full width at half maximum (FWHM) of the photoluminescence peak at difference mean residence times in segmented flow and single phase flow conditions.

In addition to the rapid initial mixing, the narrow nanocrystal size distribution arises from improved RTDs. In order to compare the RTD effects between single- and two-phase flows, it was necessary to eliminate the contribution from the initial mixing time of the precursors. This was accomplished by cooling the inlet region of the reactor so that in the single-phase mode, the pre-mixed precursors do not react until they reach the reactor channel. Similarly, in segmented flow, the precursors are mixed rapidly on-chip without reacting before they reach the heated center section. FIG. 7A is a graph depicting spectra of nanocrystal samples prepared in segmented and single-phase flow conditions. FIG. 7B is a graph depicting the FWHM of the photoluminescence peak for samples prepared at different flow rates (residence times). The spectra in FIG. 7A illustrate the improvement of the size distribution from the narrowed RTD effect. Both the absorbance and photoluminescence spectra of nanocrystals produced in segmented flow have sharper features in comparison to the single-phase case. FIG. 7B is a plot of the full width at half maximum (FWHM) of the photoluminescence peak for samples prepared at several flow conditions (mean residence times). In the single phase case, the photoluminescence peak (and therefore the size distribution) broadens at shorter times, consistent with results reported previously. See, for example, B. K. H. Yen, N. E. Stott, K. F. Jensen, M. G. Bawendi, *Adv. Materials*, 15, 1858-1862 (2003), which is incorporated by reference in its entirety. In contrast, the spectra of samples prepared in segmented flow can be uniformly narrow over the entire range of residence times. Rapid mixing and narrow RTD characteristics of gas-liquid segmented flow can be used to prepare CdSe nanocrystals with narrow size distributions. Size distribution (indicated by photoluminescence FWHM) is greatly improved in the segmented flow case. For the single phase flow case, the RTD (and therefore the size distribution) broadens at shorter times. For the segmented flow case, FWHM remains narrow over entire range of reaction times.

Figure 8A:
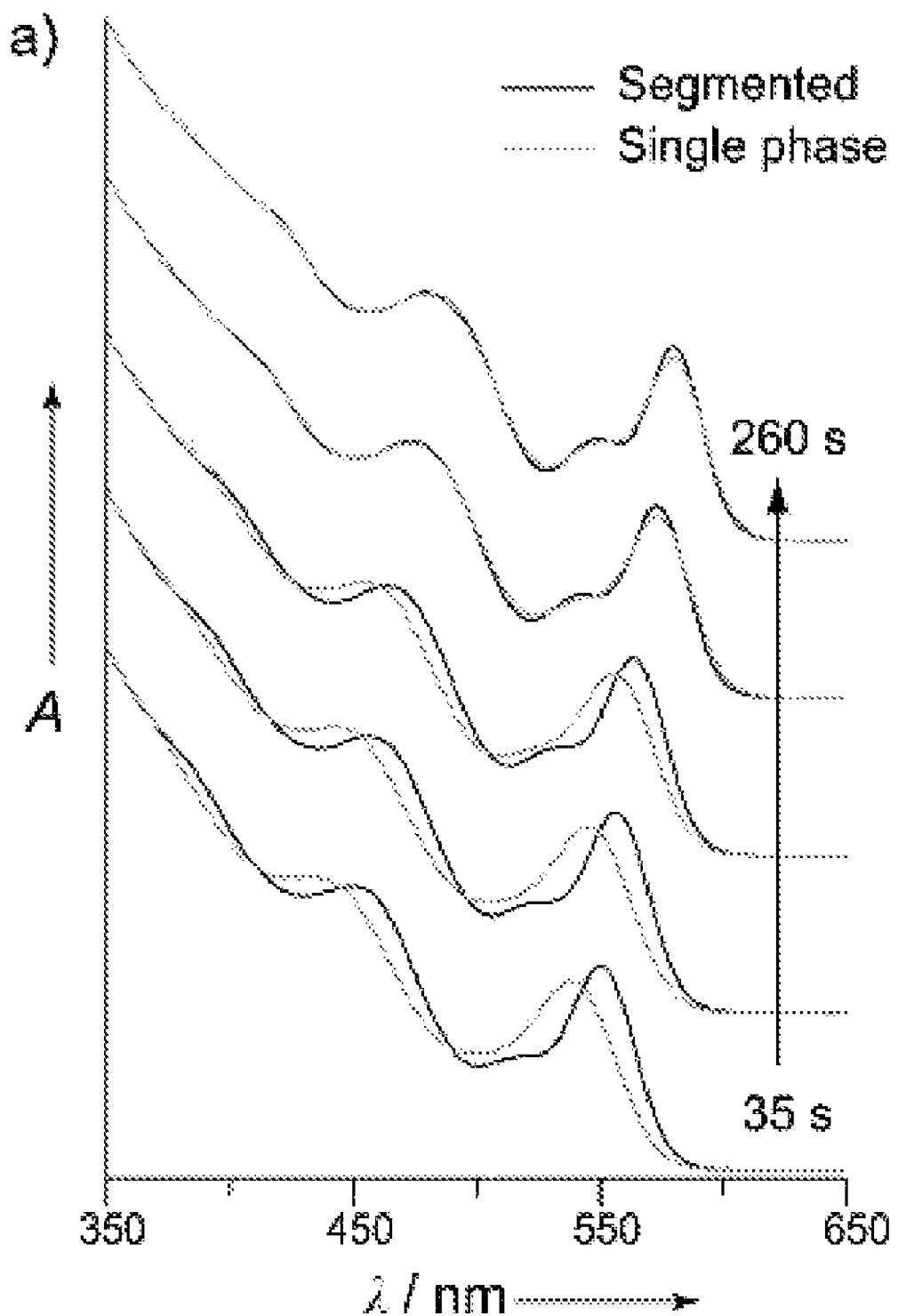
FIG. 8A is a set of graphs depicting the absorbance spectra of quantum dots prepared with segmented and single-phase flow.
Figure 8B:
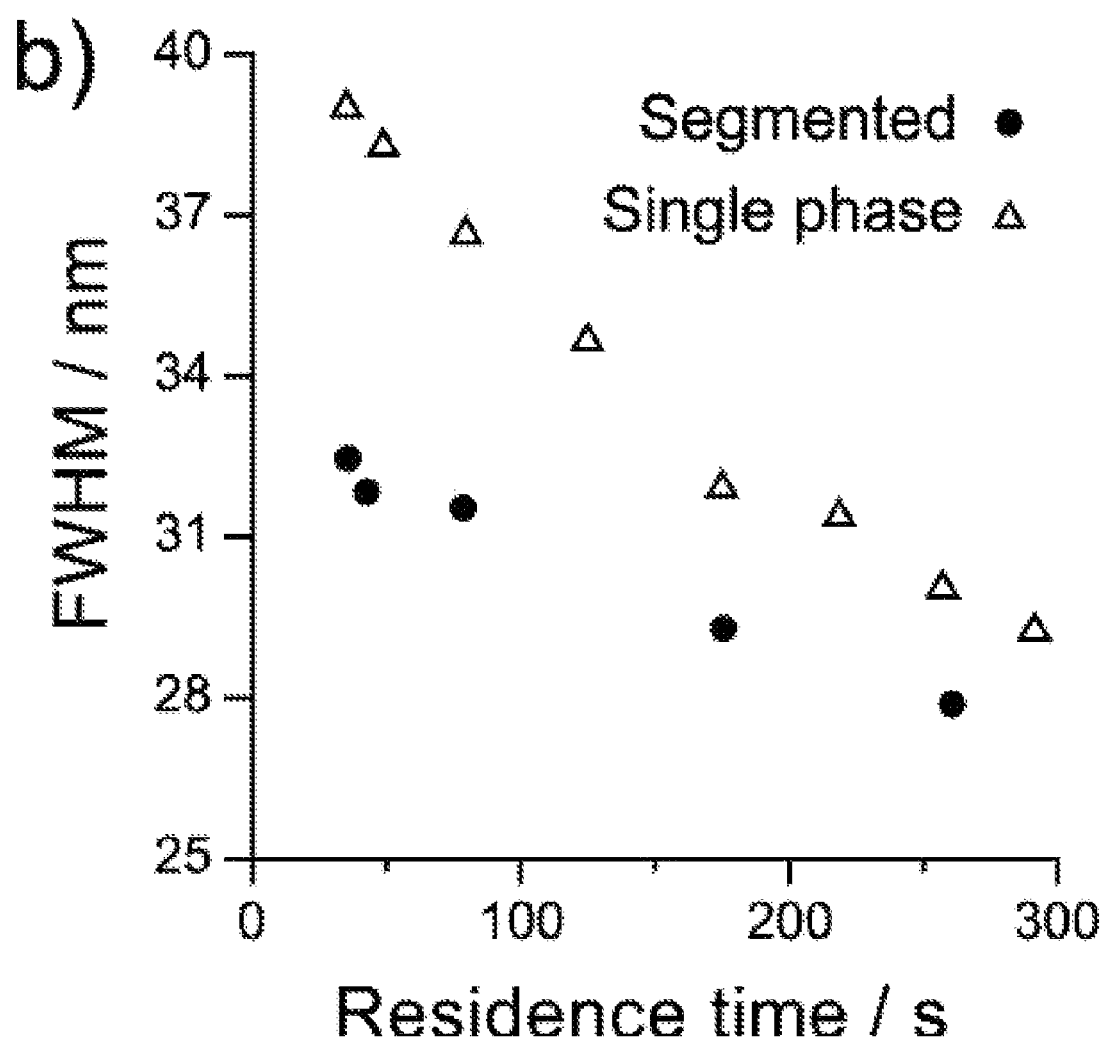
FIG. 8B is a graph depicting the PL full-width-at-half-maximum (FWHM) of quantum dot samples prepared in segmented and single-phase flow conditions.

To isolate the RTD contribution from the effects of initial mixing, the inlet region of the reactor was cooled and pre-mixed the precursors inline with a miniature convective mixer, A deep trench feature allowed us to keep the inlets thermally isolated from the main reaction channel. Cooling the inlets ensures that the pre-mixed precursors do not react until they reach the heated reaction section. In this way, the effect of initial reagent mixing was eliminated and the RTD effect was directly observed on the nanocrystal size distribution. The spectra in FIG. 8A illustrate the improvement of the size distribution resulting from segmentation. FIG. 8B is a plot of the fwhm of the PL peak for samples prepared at several flow conditions (mean residence times). For reaction times shown in FIG. 8B, the PL fwhm varies between 28 and 32 nm (99-128 meV) for segmented flow, and 29 and 39 nm (104-158 meV) for single-phase flow. In both plots in FIG. 8B, the PL peak width decreases with time, and this general trend (size distribution focusing) has been explained as evidence of the presence of a mass-transfer component in the particle growth rate (X. Peng et al., *J. Am. Chem. Soc.* 1998, 120, 5343; D. V. Talapin et al., *J. Phys. Chem. B* 2001. 105, 12278). However, the absorbance and PL spectra of nanocrystals produced in gas-liquid flow are generally sharper in than those produced in single-phase scenarios. Furthermore, the difference shown in FIGS. 8A and B between single- and two-phase flow becomes more pronounced at shorter timescale. This behavior at short times results from the fact that the RTD broadens significantly with flow rate in single-phase flow (B. K. H. Yen et al., *Adv. Mater.* 2003, 15, 1858), whereas the RTD does not have such a strong flow-rate dependence in the segmented case. Notably, cooling the inlets is not the normal mode of operation for the device. Upon introduction of the gas at low temperature, the slug uniformity is substantially poorer than the uniform segments shown in FIG. 4A. This flow destabilization results primarily from rapid expansion of gas and the large change in liquid viscosity when the fluids reach the heated section. In spite of such non-uniform segmentation, a significant improvement in OD size distribution is still observed.

Figure 8C:
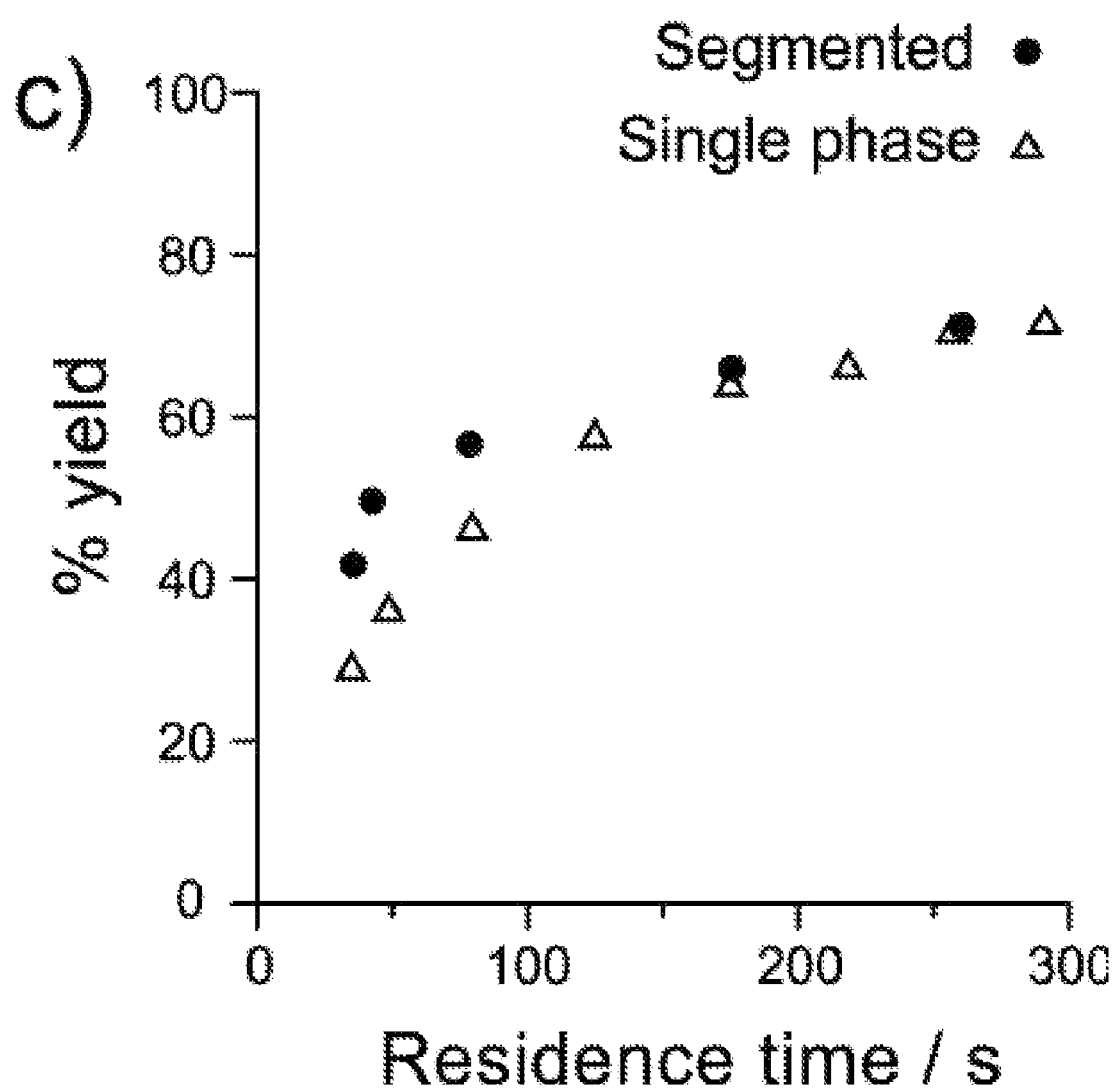
FIG. 8C is a graph depicting the reaction yield of quantum dot samples prepared in segmented and single-phase flow conditions.

FIG. 8C reveals an additional reason for the larger improvement in size distribution at shorter reaction times. In segmented flow, the mixing timescale that is governed by recirculation within liquid slugs decreases almost linearly with flow rate (A. Guenther et al., *Langmuir* 2005, 21, 1547). Therefore, a shorter reaction time (faster flow rate) is compensated by more intense stirring, and vice versa. The inverse relationship between stirring intensity and reaction time is manifested in the reaction yield curves shown in FIG. 8C. At shorter times (high flow rates), the nanocrystal reaction is driven to higher yields than those of the single-phase operation. The increased growth rate causes the nanocrystal population distribution to focus more quickly than in the single-phase case. Consequently, the difference in the two curves in the two curves in FIG. 8B is more pronounced at short times. At lower flow rates, the recirculatory stirring is slower, but the reaction time is longer, thus the yield curve converges with that for single-phase flow. Even at the longest reaction times (when the yields are similar for the two cases), the PL spectra for gas-liquid flow is still somewhat narrower, indicating that the improved RTD effect on size distribution is still present. In summary, the synthesis of acceptable nanocrystal samples by the single-phase approach requires long reaction times to allow the size distribution focusing and narrowing of the RTD time to fully develop. In segmented flow, the enhanced mixing accelerates the particle formation process, thereby decreasing the time required for focusing the size distribution, and a narrow RTD is sustained even at high flow rates. For example, from FIG. 8B, the narrow size distribution obtained in 42 s with segmented flow requires over fourfold more time (≈175 s) to achieve with single-phase flow.

A gas-liquid segmented flow reactor with multiple temperature zones can be designed and fabricated for the synthesis of nanocrystals with good photoluminescence properties and narrow size distribution. Advantageously, rapid mixing and improved residence time distributions can be achieved in segmented flow conditions (in comparison to single phase flow). The reactor can serve as a general platform for synthesis of other nanocrystal systems. With integrated optics it can become a tool for optimization of properties and investigating kinetics of nucleation and growth.

A number of embodiments have been described. Nevertheless, it will be understood that various modifications may be made without departing from the spirit and scope of the invention. For example, the methods and products described herein primarily related to methods of preparing cadmium selenide materials. However, it will be apparent to those skilled in the art that these methods can be extended to other nanocrystals, such as other metal chalcogenide and pnictide materials. Accordingly, other embodiments are within the scope of the following claims.

Each and every reference cited herein is hereby incorporated in its entirety for all purposes to the same extent as if each reference were individually incorporated by reference. Furthermore, while the invention has been described in detail with reference to preferred embodiments thereof, it will be apparent to one skilled in the art that various changes can be made, and equivalents employed, without departing from the scope of the invention.

What is claimed is:

1. A segmented-flow reactor for producing a population of nanocrystals, comprising:
   a liquid introduction port;
   a gas introduction port; and
   a flow path fluidly connected to liquid introduction port and the gas introduction port, the flow path including a first region configured to generate recirculation in a liquid volume, a second region associated with a thermal source, and a third region configured to cool a material within the flow path,
   wherein the first region and the second region are thermally insulated from each other,
   wherein the third region and the second region are thermally insulated from each other,
   wherein the flow path is microfabricated on a substrate, and
   wherein the flow path includes a meandering path.

2. A segmented-flow reactor for producing a population of nanocrystals comprising:
   a liquid introduction port;
   a gas introduction port; and
   a flow path fluidly connected to the liquid introduction port and the gas introduction port, the flow path including a first region configured to generate recirculation in a liquid volume, a second region associated with a thermal source, and a third region configured to cool a material within the flow path,
   wherein the first region and the second region are thermally insulated from each other;
   and wherein the third region and the second region are thermally insulated from each other.

3. The reactor of claim 2, wherein the flow path is microfabricated on a substrate.

4. A segmented-flow reactor for producing a population of nanocrystals comprising:
   a liquid introduction port;
   a gas introduction port; and
   a flow path fluidly connected to the liquid introduction port and the gas introduction port, the flow path including a first region configured to generate recirculation in a liquid volume, a second region associated with a thermal source, and a third region configured to cool a material within the flow path,
   wherein the first region and the second region are thermally insulated from each other;
   and wherein the flow path includes a meandering path.

5. The reactor of claim 4, wherein the flow path is microfabricated on a substrate.

* * * * *

UNITED STATES PATENT AND TRADEMARK OFFICE
CERTIFICATE OF CORRECTION

PATENT NO. : 8,101,021 B2
APPLICATION NO. : 11/955774
DATED : January 24, 2012
INVENTOR(S) : Brian Yen Page 1 of 1

It is certified that error appears in the above-identified patent and that said Letters Patent is hereby corrected as shown below:

Please delete the paragraph titled 'FEDERALLY SPONSORED RESEARCH OR DEVELOPMENT' encompassing column 1, lines 15-18:

"This invention was made with government support under Grant No. DMR-0213282 awarded by the National Science Foundation. The government has certain rights in this invention."

and replace with:

--This invention was made with government support under Grant No. CHE0209898 awarded by the National Science Foundation. The government has certain rights in this invention.--

Signed and Sealed this
Twentieth Day of November, 2012

David J. Kappos
*Director of the United States Patent and Trademark Office*